(No Model.)

V. BISSIG.
VEGETABLE SLICER.

No. 384,738. Patented June 19, 1888.

WITNESSES:
C. Neveux
C. Sedgwick

INVENTOR:
V. Bissig
BY Munn & Co
ATTORNEYS.

UNITED STATES PATENT OFFICE.

VINCENT BISSIG, OF GREENVILLE, NEW JERSEY.

VEGETABLE-SLICER.

SPECIFICATION forming part of Letters Patent No. 384,738, dated June 19, 1888.

Application filed April 5, 1888. Serial No. 269,668. (No model.)

*To all whom it may concern:*

Be it known that I, VINCENT BISSIG, of Greenville, in the county of Hudson and State of New Jersey, have invented a new and useful Improvement in Vegetable-Slicers, of which the following is a full, clear, and exact description.

This invention relates to that description of vegetable-slicers which are used for cutting up or slicing in a continuous or spiral manner potatoes and other edible roots or tubers, plants, and fruits, to prepare said vegetables for cooking and table use, and in which the vegetable, held by one hand, is speared or spitted by an entering screw that has attached to it on one side of its axis a knife provided with a handle at its outer end, and which knife, on being rotated in common with the screw, slices the vegetable as above, the screw serving to keep up the feed.

The invention consists in a novel construction of such vegetable-slicer, substantially as hereinafter described, and pointed out in the claims.

Reference is to be had to the accompanying drawings, forming a part of this specification, in which similar letters of reference indicate corresponding parts in all the figures.

Figure 1:
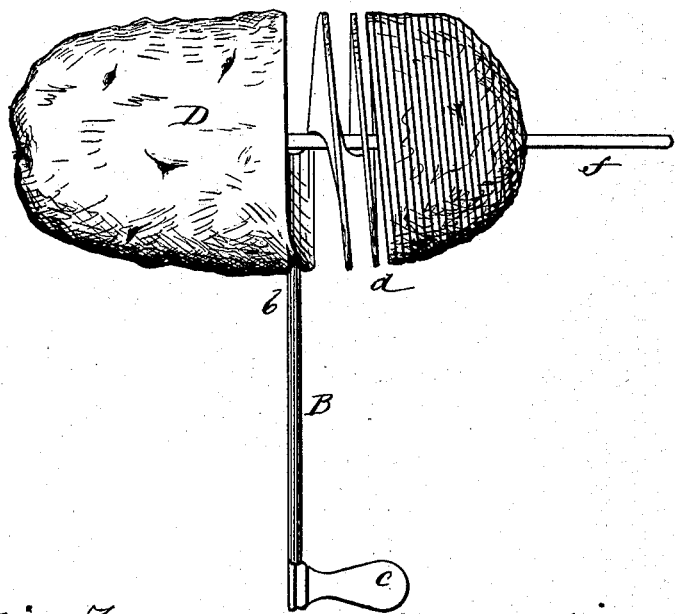
Figure 3:
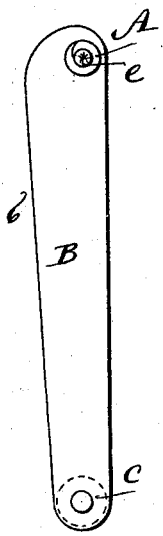
Figure 2:
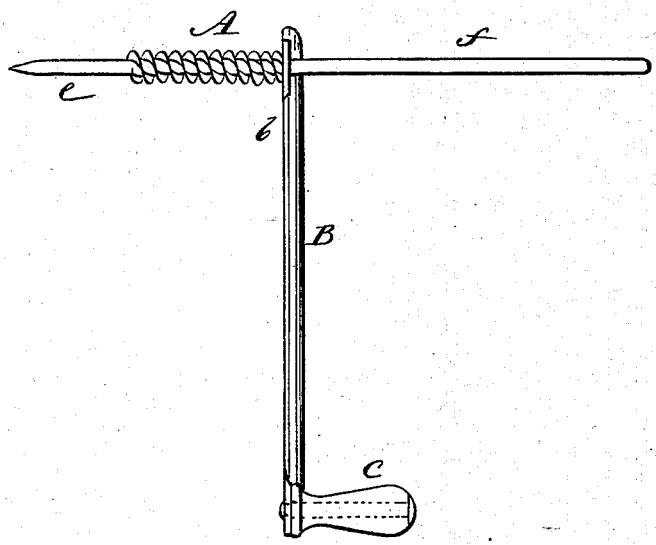

Figure 1 represents a side view of a vegetable-slicer embodying my invention, and showing the same as used upon a potato. Fig. 2 is a similar view of the slicer with the vegetable removed, and Fig. 3 a view at right angles to Fig. 2.

A is the screw upon which the vegetable to be sliced is speared or spitted, and B is the knife at the back end of the screw, on one side of the axis thereof, and with its face in a crosswise direction slightly oblique to said axis, corresponding with the pitch of the screw, as usual. Said knife is here represented as a straight one—that is, as having a straight cutting-edge, $b$; but such is not imperative, as it might be curved. Upon the outer end of the knife is the handle $c$, by which said knife is rotated in common with the screw to spirally slice the vegetable, as shown in Fig. 1, D representing the potato or vegetable. Any other means may be used for rotating the knife and screw, the latter of which keeps up the feed of the vegetable to the knife or the latter to the vegetable to produce a continuous spiral slice, $d$, the vegetable being held by the hand of the operator from turning while the cut is being made. About such construction and operation so far there is nothing new.

To give a steadier hold and better guidance to the vegetable, and to prevent the threads of the screw from choking, the forward end of the screw A is constructed with a smooth or unthreaded and pointed extension, $e$.

The back end of the screw is constructed or provided in axial line with the screw with an elongated arm or extension, $f$, which serves to keep the spirally-cut slice from dropping down back of the knife to interfere with the working of the hand used in rotating the knife and screw, and which prevents the continuous slice from breaking and causes it to be collected or held till the whole slicing has been done, after which it may be slipped off said arm or extension $f$, ready for use.

Having thus described my invention, what I claim as new, and desire to secure by Letters Patent, is—

1. In a vegetable slicer having a screw, A, and attached knife B, the screw A, provided with an elongated arm or extension, $f$, at its back and in rear of the knife, in axial relation with the screw, essentially as and for the purpose herein set forth.

2. In a vegetable-slicer operating substantially as described, the combination of the screw A, having a forward smooth extension, $e$, the knife B, and the elongated arm or extension $f$ in axial relation with the screw, back of the knife, essentially as shown and described.

VINCENT BISSIG.

Witnesses:
   A. GREGORY,
   EDGAR TATE.